(12) United States Patent
Yamamoto et al.

(10) Patent No.: US 6,665,022 B1
(45) Date of Patent: Dec. 16, 2003

(54) INPUT CIRCUIT OF TV TUNER

(75) Inventors: Masaki Yamamoto, Fukushima-ken (JP); Toshiro Furuta, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 430 days.

(21) Appl. No.: 09/714,407

(22) Filed: Nov. 16, 2000

(30) Foreign Application Priority Data

Dec. 1, 1999 (JP) .......................................... 11-341684

(51) Int. Cl.[7] .............................. H04N 5/44; H04N 5/50
(52) U.S. Cl. ....................... 348/731; 348/725; 455/295; 455/317
(58) Field of Search ................................ 348/735, 736, 348/731–733, 729, 21; 455/180.2, 188.2, 191.2, 195.1, 197.2, 182.3, 179.1, 197.1, 295, 317, 326, 339; H04N 5/50, 5/44

(56) References Cited

U.S. PATENT DOCUMENTS 4,291,290 A * 9/1981 Ijichi et al. ..................... 334/1
4,399,559 A * 8/1983 Theriault .................. 455/179.1

FOREIGN PATENT DOCUMENTS

JP        10-327370       12/1998

* cited by examiner

*Primary Examiner*—Michael H. Lee
(74) *Attorney, Agent, or Firm*—Brinks Hofer Gilson & Lione

(57) ABSTRACT

It is an object of the present invention to provide an input circuit of a TV tuner without causing unnecessary attenuation within a VHF high band bandwidth and without worsening performance such as NF, input sensitivity, and S/N when receiving a VHF high band signal. The input circuit of a TV tuner is provided with a parallel resonance circuit and an input tuning circuit connected to an output of the resonance circuit, a varactor diode is provided in parallel with the parallel resonance circuit, and a resonance frequency of a parallel connecting circuit connecting in parallel the parallel resonance circuit with the varactor diode in a nonconductive state is set to a frequency of an FM broadcasting band. Further, a capacitance value of a capacitor is set such that a resonance frequency of a parallel connecting circuit connecting in parallel a second inductor in a conductive state of the varactor diode with the parallel resonance circuit constitutes a frequency higher than the VHF high band bandwidth.

3 Claims, 2 Drawing Sheets

INPUT CIRCUIT OF TV TUNER

BACKGROUND OF THE INVENTION

This invention relates to a VHF high frequency input circuit of a TV tuner.

A constitution of a VHF high frequency input circuit of a conventional TV tuner will be described with reference to FIG. 3. One end of an FM trap circuit 32 is connected to an input end S1 via a DC blocking capacitor 31.

The FM trap circuit 32 constitutes a parallel resonance circuit composed of a capacitor 32a and an inductor 32b, and resonates to a frequency of an FM broadcasting signal. An inductor 36 and an inductor 37 are connected in series to the other end of the FM trap circuit 32 via a DC blocking capacitor 33, and the other end of the inductor 37 is grounded via a DC blocking capacitor 38.

Further, an anode of a switching diode 40 is connected via a DC blocking capacitor 39 to a connecting point connecting the inductor 36 with the inductor 37. Further, one end of an inductor 43 is connected to a cathode of the diode 40 via a DC blocking capacitor 42. A cathode of a tuning varactor diode 44 is connected to the other end of the inductor 43, and an anode of the diode 44 is grounded. Further, the other end of the inductor 43 is connected to a high frequency amplifier 46 via a DC blocking capacitor 45.

In addition, a cathode of a switching diode 34 is connected to one end of the FM trap circuit 32. Further, an anode of a diode 34 is connected to one end of an inductor 41, and also is connected to a connecting point connecting the inductor 36 with the DC blocking capacitor 33. In addition, the other end of the inductor 41 is connected to the cathode of the diode 40.

Further, a terminal Fm, as for application of a bias voltage to the diodes 34 and 40, is connected to the other end of the FM trap circuit 32 via a resistor, a terminal Lb is connected to the other end of the inductor 37 via a resistor, and a terminal Hb is connected to the anode of the switching diode 40 via a resistor. In addition, a terminal Tu, as for application of a tuning voltage to the varactor diode 44 is connected to the one end of the inductor 43 via a resistor.

Next, an operation of an input tuning circuit of the conventional TV tuner will be described. When receiving a proximity TV signal of a frequency the closest to an FM broadcasting band, the switching diode is brought into a nonconductive state by respectively imparting voltages Vlo and Vfm (Vfm>Vlo) to the terminals Lb and Fm and by applying a reverse bias voltage to the switching diode 34, and then an FM broadcasting signal is attenuated by making the FM trap circuit 32 operable. Simultaneously, the switching diode 40 is also brought into a nonconductive state by grounding the terminal Hb and by applying a reverse bias voltage to the diode 40. Further, a voltage Vtu is applied to the varactor diode 44 from the terminal Tu. With such operations, an output signal of the received proximity TV signal is transmitted to a high frequency amplifier 46 by tuning in to a frequency of a received signal by means of an inductance composed of the inductor 36 and the inductor 37 connected to each other in series and of the inductor 41 and the inductor 43 connected to each other in series and by means of a capacitance of the varactor diode 44.

Further, when receiving a VHF low band except the proximity TV signal of a frequency the closest to the FM broadcasting band, the switching diode 34 is brought into a conductive state as a by-pass route of the FM trap circuit 32 by grounding the terminal Fm and by adding a bias voltage Vlo to the terminal Lb. Simultaneously, the switching diode 40 is brought into a nonconductive state by grounding the terminal Hb and by applying a reverse bias voltage to the switching diode 40. With such operations, similarly as described above, the output signal of the received VHF low band can be transmitted to the high frequency amplifier 46 by tuning in to a frequency of a received signal by means of an inductance composed of the inductor 36 and the inductor 37 connected to each other in series and of the inductor 41 and the inductor 43 connected to each other in series and by means of a capacitance of the varactor diode 44.

Further, when receiving a VHF high band, the switching diode 34 is brought into a conductive state as a by-pass route of the FM trap circuit 32 by grounding the terminal Fm and by adding a bias voltage Vhi to the terminal Hb. Simultaneously, the switching diode 40 is brought into a conductive state by grounding the terminal Lb and by applying a bias voltage to the diode 40. With such operations, the output signal of the received VHF high band is transmitted to the high frequency amplifier 46 by tuning in to a frequency of a received signal by means of an inductance composed of the inductor 37 and the inductor 43 and by means of a capacitance of the varactor diode 44.

In the conventional TV tuner as described above, the diode 34, the capacitor 33, the inductor 36, and the inductor 41 are connected to one another. However, these connections are conducted by means of a conductor land provided on the printed circuit board. Further, since the size of the conductor land is large, an inductance thereof is not negligible. An equivalent circuit of a portion of the conductor land paid attention to a side of the FM trap circuit 32 when receiving a VHF high band is illustrated in FIG. 4. That is, an inductor 47 having a very small inductance by means of the conductor land described above is intervened between the anode of the diode 34 and the other end of the capacitor 33. Therefore, drawbacks as described hereinafter will be generated.

When receiving the VHF high band, as described above, the switching diode 34 is brought into a conductive state without transmitting a received signal to the FM trap circuit 32. However, at this time, the inductor 47 having a very small inductance is connected to the diode 34 in series. Accordingly, the inductor 47 is connected to the FM trap circuit 32 in parallel. In the mean time, since a capacitance value of the capacitor 33 is remarkably large compared with a capacitance value of the capacitor 32a, the capacitor 33 is negligible. Further, since an inductance of the inductor 32b is exceedingly large compared with an inductance of the inductor 47, the inductor 32b is negligible.

Accordingly, a parallel resonance circuit composed of the capacitor 32a and the inductor 47 is constituted from the result described above. Further, a resonance frequency of a parallel resonance circuit by means of a capacitance of the capacitor 32a set for an FM trap frequency and a very small inductance of the inductor 47 resides in a receiving VHF high band frequency band. Therefore, a received VHF high band signal receives attenuation in the vicinity of this resonance frequency, therefore has worsened characteristics such as NF, input sensitivity, and S/N.

SUMMARY OF THE INVENTION

Thus, an object of the present invention is to provide a TV tuner in which when receiving a VHF high band, a received VHF high band signal receives no attenuation at all and no influence is exerted on characteristics such as NF, input sensitivity, and S/N.

An input circuit of a TV tuner according to the present invention includes a parallel resonance circuit composed of a capacitor and a first inductor with one end of the parallel resonance circuit being connected to an input end, an input tuning circuit connected to the other end of the parallel resonance circuit described above and capable of tuning in to frequencies of respective bands by being switched to a low band and a high band of VHF bands, and a varactor diode brought into a nonconductive state when receiving a proximity TV signal of a frequency the closest to an FM broadcasting band and brought into a conductive state when receiving other TV signals. One end of the varactor diode is connected to one end of the parallel resonance circuit described above. The other end of the varactor diode is connected to the other end of the parallel resonance circuit described above via a second inductor having a very small inductance. A resonance frequency of a parallel connecting circuit connecting in parallel the varactor diode in a non-conductive state with the parallel resonance circuit described above is set to a frequency of the FM broadcasting band and a resonance frequency of a parallel connecting circuit connecting in parallel the second inductor in a conductive state of the varactor diode described above with the parallel resonance circuit is set to a frequency higher than the high band bandwidth described above.

The input tuning circuit described above has two low band tuning inductors of the parallel resonance circuit and the varactor diode, and the two low band tuning inductors are arranged on a printed circuit board. A conductor land for connecting the other end of the parallel resonance circuit and the other end of the varactor diode with respective side ends of each of the two low band tuning inductors is provided on the printed circuit board described above. The two low band tuning inductors is connected in series by means of the conductor land, and the second inductor is constituted by means of the conductor land described above.

The input circuit of a TV tuner further includes a switching diode connected between both ends of the two low band tuning inductors connected in series described above, a first terminal connected in a DC way to a cathode of the varactor diode, a second terminal connected in a DC way to an anode of the varactor diode and a cathode of the switching diode, and a third terminal connected in a DC way to an anode of the switching diode; Wherein respective receiving bands are capable of being switched by applying bias voltages respectively to the first terminal and the second terminal and by grounding the third terminal when receiving the proximity TV signal described above, by applying the bias voltage to the second terminal and by grounding the first terminal and the third terminal when receiving a low band TV signal except the proximal TV signal described above, and by applying a bias voltage to the third terminal and by grounding the first terminal and the second terminal when receiving a high band TV signal.

DETAILED DESCRIPTION OF THE PREFERRED EMBODIMENTS

Figure 1:
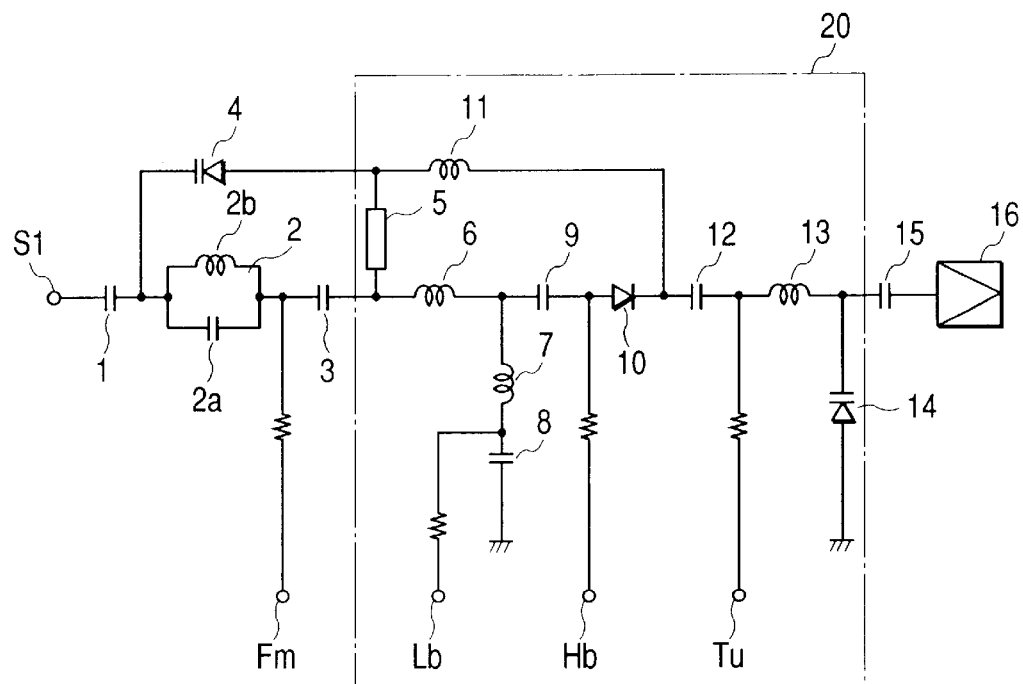
FIG. 1 shows a circuit diagram illustrating an embodiment of an input circuit of a TV tuner according to the present invention.
Figure 2:
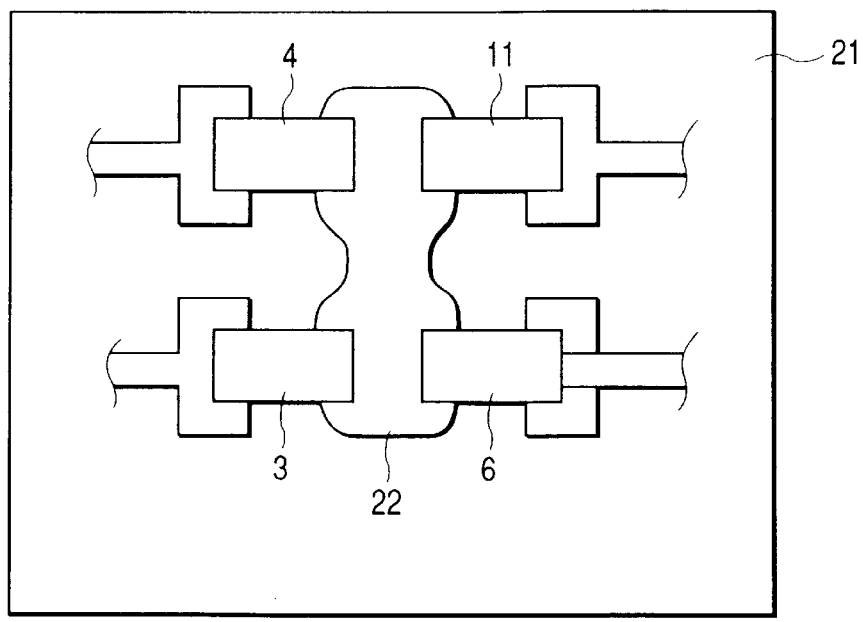
FIG. 2 shows a view explaining an embodiment of an input circuit of a TV tuner according to the present invention.
Figure 3:
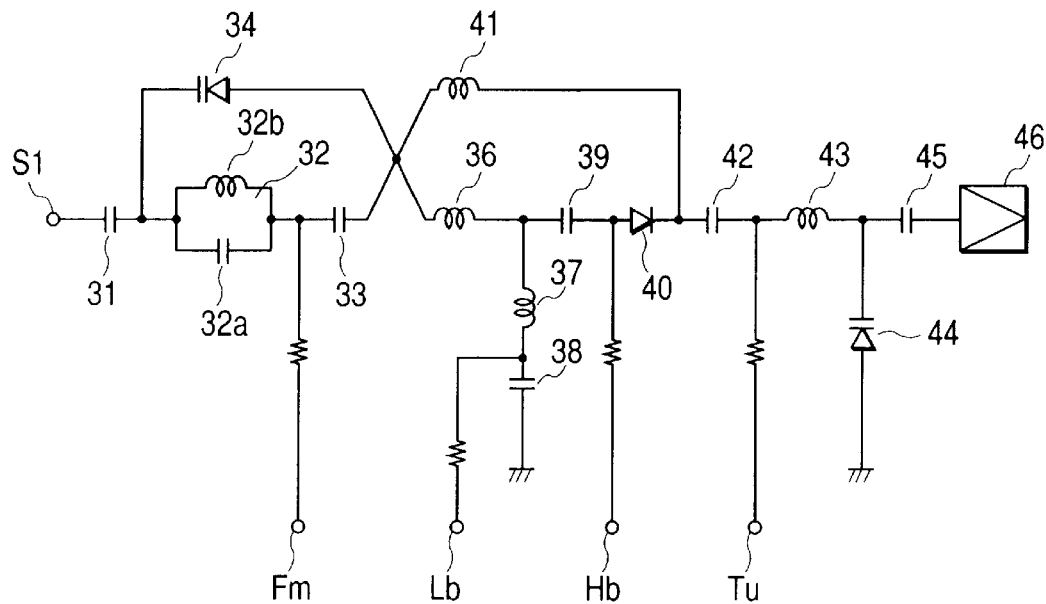
FIG. 3 shows a circuit diagram illustrating an embodiment of an input circuit of a conventional TV tuner.
Figure 4:
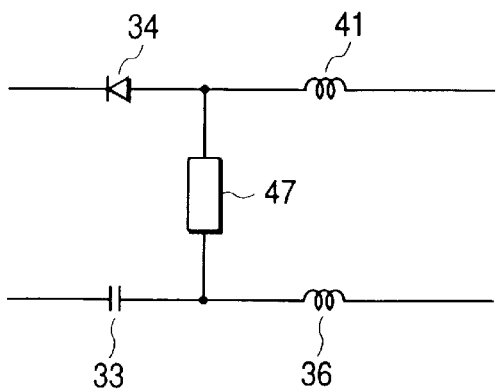
FIG. 4 shows a circuit diagram illustrating another embodiment of an input circuit of a conventional TV tuner.

A TV tuner according to the present invention will be described with reference to FIG. 1. One end of a parallel resonance circuit 2 connecting in parallel a capacitor 2a with a first inductor 2b is connected to an input end S1 via a DC blocking capacitor 1. An input tuning circuit 20 is connected to the other end of the parallel resonance circuit 2 via a DC blocking capacitor 3. The input tuning circuit 20 has two low band tuning inductors 6 and 11, two high band tuning inductors 7 and 13, a switching diode 10, a tuning first varactor diode 14 or the like. Further, the low band tuning inductor 6 and the high band tuning inductor 7 are connected in series to the capacitor 3, and the high band tuning inductor 7 is grounded via a DC blocking capacitor 8.

In addition, an anode of the switching diode 10 is connected via a DC blocking capacitor 9 to a connecting point connecting the low band tuning inductor 6 with the high band tuning inductor 7. Further, one end of a high band tuning inductor 13 is connected to a cathode of the diode 10 via a DC blocking capacitor 12. A cathode of the tuning first varactor diode 14 is connected to the other end of the high band tuning inductor 13 and an anode of the varactor diode 14 is grounded. Further, the other end of the high band tuning inductor 13 is connected to a high frequency amplifier 16 via a DC blocking capacitor 15.

Further, a cathode of a second varactor diode 4 is connected to a connecting point connecting the capacitor 1 with the parallel resonance circuit 2. Further, one end of the low band tuning inductor 11 is connected to an anode of the second varactor diode 4 and the other end of the inductor 11 is connected to the cathode of the diode 10. Further, a space between a connecting point connecting the capacitor 3 with the low band tuning inductor 6 and a connecting point connecting the inductor 11 with the anode of the second varactor diode 4 is connected via a second inductor 5 having a very small inductance.

As a result, the second varactor diode 4 is connected in parallel to the parallel resonance circuit 2, a capacitance of the second varactor diode 4 and a resonance frequency of the parallel connecting circuit connecting in parallel the capacitor 2a with the first inductor 2b are set so as to become equal to a frequency of an FM broadcasting band. Further, four inductors 7, 6, 11 and 13 are connected in series, and a space between a connecting point connecting the low band tuning inductor 6 with the high band tuning inductor 7 and a connecting point connecting the low band tuning inductor 11 with the high band tuning inductor 13 is connected by means of the diode 10.

In the mean time, the second inductor 5 may well be constituted by means of a conductor for connecting the second varactor diode 4, the capacitor 3, the low band tuning inductor 6, and the low band tuning inductor 11 to one another, for example, by means of a conductor land 22 provided on a printed circuit board 21.

Further, a first terminal (Fm) is connected to the other end of the parallel resonance circuit 2 via a resistor as for application of a bias voltage to the second varactor diode 4 and the switching diode 10, a second terminal (Lb) is connected to the other end of the high band tuning inductor 7 via a resistor, a third terminal (Hb) is connected to the anode of the switching diode 10 via a resistor, and a fourth terminal (Tu) is connected to one end of the inductor 13 via a resistor as for application of a tuning voltage to the first varactor diode 14.

Next, an operation of an input circuit of the TV tuner of the present invention will be described. When receiving a proximity TV signal of the closest frequency to the FM broadcasting band, the second varactor diode 4 is brought into nonconductive state by respectively imparting voltages Vfm and Vl0 (Vfm>Vlo) to the first terminal (Fm) and second terminal (Lb) and by applying a voltage of a difference between the voltage Vfm and the voltage Vl0 to the second varactor diode 4 as a reverse bias voltage. Thereby, an inputted FM broadcasting signal is attenuated.

Further, at the same time, the switching diode 10 is brought into a nonconductive state by grounding the third terminal (Hb) and by applying a reverse bias voltage of the voltage Vlo to the switching diode 10. Further, a voltage Vtu is applied to the first varactor diode 14 from the fourth terminal (Tu). In this way, an output signal of the received proximity TV signal is transmitted to the high frequency amplifier 16 by being synchronized with a frequency of a received signal by means of an inductance composed of the low band tuning inductor 6 and the high band tuning inductor 7 connected to. each other in series and of the low band tuning inductor 11 and the high band tuning inductor 13 connected to each other in series via the DC blocking capacitor 12 and by means of a capacitance of the first varactor diode 14.

Further, when receiving a VHF low band except the proximity TV signal, the second varactor diode is brought into a conductive state by grounding the first terminal (Fm) and by adding a bias voltage Vlo to the second terminal (Lb). At the same time, the switching diode 10 is brought into a nonconductive state by grounding the third terminal (Hb) and by applying a reverse bias voltage to the switching diode 10. Further, the voltage Vtu is applied to the first varactor diode 14 from the fourth terminal (Tu). In this way, the output signal of the received VHF low band is transmitted to the high frequency amplifier 16 by being synchronized with a frequency of a received signal by means of an inductance composed of the low band tuning inductor 6 and the high band tuning inductor 7 connected to each other in series and of the low band tuning inductor 11 and the high band tuning inductor 13 connected to each other in series and by means of a capacitance of the first varactor diode 14.

Furthermore, when receiving a VHF high band, the second varactor diode is brought into a conductive state by grounding the second terminal (Lb) and by adding a bias voltage Vhi to the third terminal (Hb) At the same time, the second varactor diode 4 is brought into a conductive state by grounding the first terminal (Fm) In this way, the output signal of the received VHF high band is transmitted to the high frequency amplifier 46 by being synchronized with a frequency of a received signal by means of the inductance composed of the high band tuning inductor 7 and the high band tuning inductor 13 and by means of the capacitance of the varactor diode 14.

However, at this time, the second inductor 5 exists in a way to be connected in parallel to the parallel resonance circuit 2 via the second varactor diode 4 being in the conductive state. Therefore, a novel parallel resonance circuit composed of the capacitor 2a and the second inductor 5 (here, with regard to the capacitor 3 and the inductor 2b, both of them can be negligible since they are enormously large in capacity compared respectably with the capacitor 2a and the second inductor 5) is constituted.

However, in the present invention, a resonance frequency of parallel connecting circuit connecting in parallel the varactor diode 4 in the nonconductive state with the parallel resonance circuit 2 is set to the frequency of the FM broadcasting band and a capacitance value of the capacitor 2a is set such that the resonance frequency of the parallel connecting circuit connecting in parallel the second inductor 5 in the conductive state of the varactor diode 4 with the parallel resonance circuit 2 becomes a frequency higher than the VHF high band bandwidth. Accordingly, the resonance frequency of this novel parallel resonance circuit does not exist within the frequency band of receiving VHF high band. Therefore, the signal of the received VHS high band does not bear attenuation in the vicinity of this resonance frequency, and characteristics such as NF, input sensitivity, and S/N are never deteriorated.

As descried above, an input circuit of a TV tuner according to the present invention is provided with a parallel resonance circuit composed of a capacitor and a first inductor while one end of the parallel resonance circuit being connected to an input end, an input tuning circuit connected to the other end of this parallel resonance circuit and capable of tuning in to frequencies of respective bands by being switched to a low band and a high band of VHF bands, and a varactor diode brought into a nonconductive state when receiving a proximity TV signal of a frequency the closest to an FM broadcasting band and brought into a conductive state when receiving the other TV signal, wherein one end of the varactor diode is connected to one end of the parallel resonance circuit, the other end of the varactor diode is connected to the other end of the parallel resonance circuit via a second inductor having a very small inductance, a resonance frequency of a parallel connecting circuit connecting in parallel the varactor diode in the nonconductive state with the parallel resonance circuit is set to a frequency of the FM broadcasting band, and a resonance frequency of the parallel connecting circuit connecting in parallel the second inductor in the conductive state of the varactor diode with the parallel resonance circuit is set to a frequency higher than the high band bandwidth. Accordingly, since the resonance frequency of the parallel connecting circuit described above does not exist within receiving VHF high band frequency band, a signal of the received VHS high band does not bear attenuation in the vicinity of this resonance frequency, and characteristics of the input circuit such as NF, input sensitivity, and S/N are never deteriorated.

The input tuning circuit described above has two low band tuning inductors of the parallel resonance circuit and the varactor diode, and the two low band tuning inductors are arranged on a printed circuit board, a conductor land for connecting the other end of the parallel resonance circuit and the other end of the varactor diode with respective side ends of each of two low band tuning inductors is provided on the printed circuit board described above, the two low band tuning inductors being connected in series by means of the conductor land and also the second inductor being constituted by means of the conductor land, so that an addition of a novel circuit element with respect to a conventional constitution is not necessitated.

The input circuit of a TV tuner further includes a switching diode connected between both ends of the two low band tuning inductors connected in series, a first terminal connected in a DC way to a cathode of the varactor diode, a second terminal connected in a DC way to an anode of the varactor diode and a cathode of the switching diode, and a third terminal connected in a DC way to an anode of the switching diode, wherein respective receiving bands are capable of being simply switched by applying bias voltages respectively to the first terminal and the second terminal and by grounding the third terminal when receiving the proximity TV signal, by applying the bias voltage described above to the second terminal and by grounding the first terminal and the third terminal when receiving a low band TV signal except the proximity TV signal, and applying a bias voltage to the third terminal and by grounding the first terminal and the second terminal when receiving a high band TV signal.

What is claimed is:

1. An input circuit of a TV tuner comprising:

a parallel resonance circuit composed of a first capacitor and a first inductor with one end of the parallel resonance circuit being connected to an input end; a second capacitor with one end being connected to the other end of the parallel resonance circuit; an input tuning circuit connected to the other end of the second capacitor and capable of tuning in to frequencies of respective bands by being switched to a low band and a high band of VHF bands; and a varactor diode brought into a nonconductive state when receiving a proximity TV signal of a frequency the closest to an FM broadcasting band and brought into a conductive state when receiving other TV signals, one end of the varactor diode being connected to one end of the parallel resonance circuit, the second inductor being connected between the other end of the varactor diode and the other end of the second capacitor, a resonance frequency of a parallel connecting circuit connecting in parallel the varactor diode in a nonconductive state with a series connecting circuit of the second inductor and the second capacitor and the parallel resonance circuit being set to a frequency of the FM broadcasting band and a resonance frequency of a parallel connecting circuit connecting in parallel the second inductor in the conductive state of the varactor diode with the series connecting circuit of the second inductor and the second capacitor and the parallel resonance circuit being set to a frequency higher than the high band bandwidth.

2. The input circuit of a TV tuner according to claim 1, wherein the input tuning circuit has two low band tuning inductors, and the parallel resonance circuit, the varactor diode, and the two low band tuning inductors are arranged on a printed circuit board, a conductor land for connecting the other end of the second capacitor and the other end of the varactor diode with respective side ends of each of the two low band tuning inductors is provided on the printed circuit board, the two low band tuning inductors being connected in series by means of the conductor land and also the second inductor being constituted by means of the conductor land.

3. The input circuit of the TV tuner according to claim 1, the input circuit further comprises a switching diode connected between both ends of the two low band tuning inductors connected in series, a first terminal connected in a DC way to a cathode of the varactor diode, a second terminal connected in a DC way to an anode of the varactor diode and a cathode of the switching diode, and a third terminal connected in a DC way to an anode of the switching diode, wherein respective receiving bands are capable of being switched by applying bias voltages respectively to the first terminal and the second terminal and by grounding the third terminal when receiving the proximity TV signal, by applying the bias voltage to the second terminal and by grounding the first terminal and the third terminal when receiving a low band TV signal except the proximity TV signal, and by applying a bias voltage to the third terminal and by grounding the first terminal and the second terminal when receiving a high band TV signal.

* * * * *